(12) United States Patent
Husberg et al.

(10) Patent No.: US 12,036,986 B2
(45) Date of Patent: Jul. 16, 2024

(54) COMPUTER-IMPLEMENTED METHOD FOR CLUTCH START CONTROL OF AN INTERNAL COMBUSTION ENGINE IN A VEHICLE

(71) Applicant: VOLVO TRUCK CORPORATION, Gothenburg (SE)

(72) Inventors: Tobias Husberg, Kareby (SE); Erik Lauri, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/177,517

(22) Filed: Mar. 2, 2023

(65) Prior Publication Data
US 2023/0294693 A1    Sep. 21, 2023

(30) Foreign Application Priority Data
Mar. 17, 2022  (EP) ..................................... 22162696

(51) Int. Cl.
*B60W 10/02* (2006.01)
*B60W 10/06* (2006.01)
(Continued)

(52) U.S. Cl.
CPC .......... *B60W 30/143* (2013.01); *B60W 10/02* (2013.01); *B60W 10/06* (2013.01); *B60W 10/10* (2013.01); *B60W 30/18136* (2013.01); *B60W 50/0097* (2013.01); *F02D 41/021* (2013.01); *F02D 41/065* (2013.01); *F02D 41/12* (2013.01); *B60W 2552/15* (2020.02); *F02D 2200/501* (2013.01); *F02D 2200/70* (2013.01)

(58) Field of Classification Search
CPC ...... B60W 10/02; B60W 10/00; B60W 10/10; B60W 30/143; B60W 30/18136; B60W 50/0097; B60W 2552/15; F02D 41/021; F02D 41/065; F02D 41/12; F02D 2200/501; F02D 2200/70
See application file for complete search history.

(56) References Cited

U.S. PATENT DOCUMENTS

2015/0314775 A1   11/2015   Dextreit et al.
2017/0080919 A1*   3/2017   Follen ................... B60W 10/06
(Continued)

FOREIGN PATENT DOCUMENTS

WO    2018140366 A1   8/2018

OTHER PUBLICATIONS

Extended European Search Report in corresponding European Application No. 22162696.3 dated Sep. 20, 2022 (9 pages).

*Primary Examiner* — Edwin A Young
(74) *Attorney, Agent, or Firm* — Venable LLP; Jeffri A. Kaminski

(57) ABSTRACT

A computer-implemented method for clutch start control of an internal combustion engine, ICE, in a vehicle is described. When the vehicle is travelling on a road with the ICE being shut off, topographic data representative of the topography of an upcoming road segment is acquired. A driving scenario for at least a part of the upcoming road segment is predicted based on the acquired topographic data. A gear is selected based on the predicted driving scenario. The ICE is started on the selected gear before or when the vehicle reaches said part of the road segment.

16 Claims, 4 Drawing Sheets

(51) Int. Cl.
*B60W 10/10* (2012.01)
*B60W 30/14* (2006.01)
*B60W 30/18* (2012.01)
*B60W 50/00* (2006.01)
*F02D 41/02* (2006.01)
*F02D 41/06* (2006.01)
*F02D 41/12* (2006.01)

(56) References Cited

U.S. PATENT DOCUMENTS

2018/0297578 A1 10/2018 Park
2020/0191069 A1* 6/2020 Naidu ................. F02D 41/2451
2021/0370907 A1 12/2021 Huang et al.

* cited by examiner

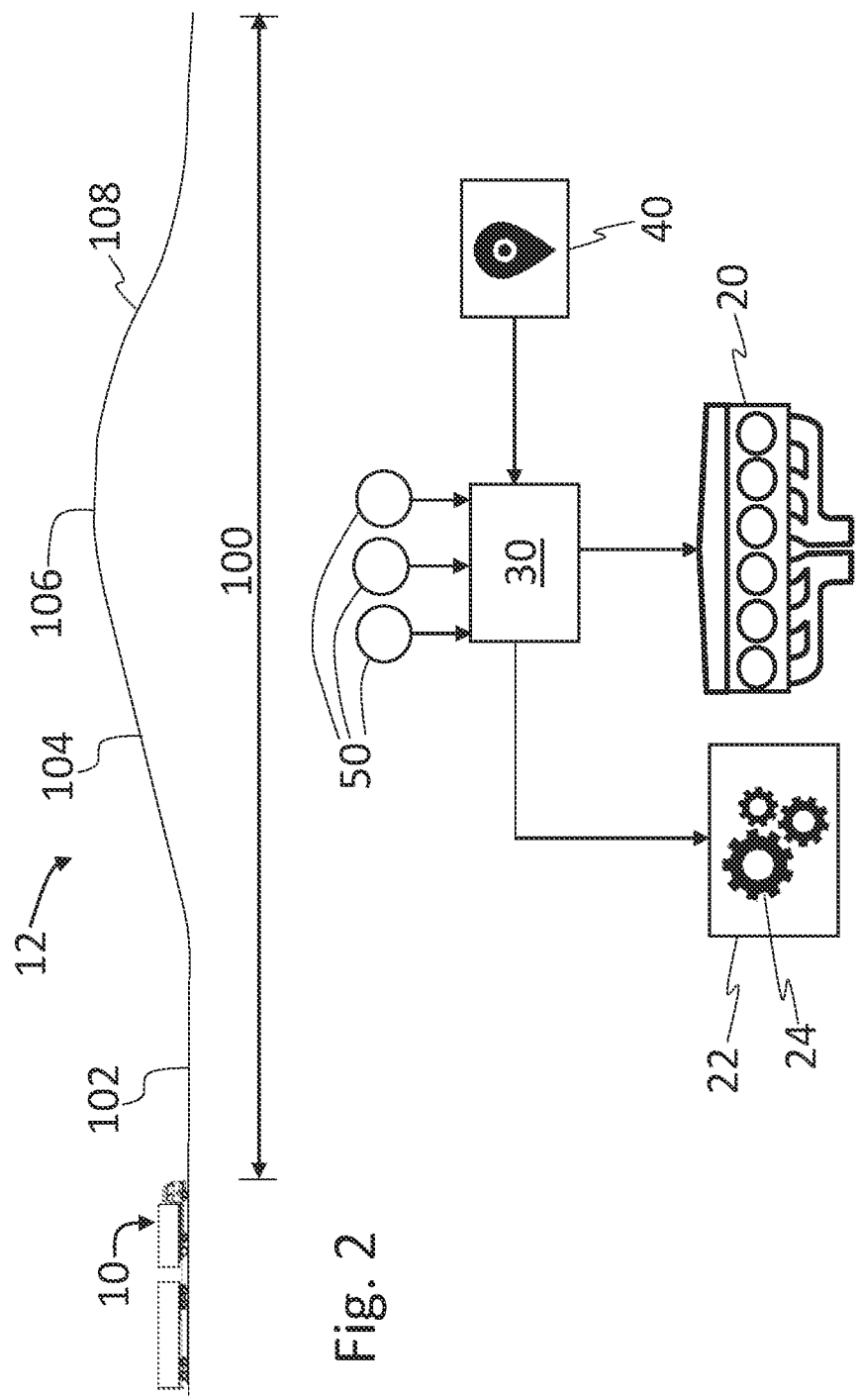

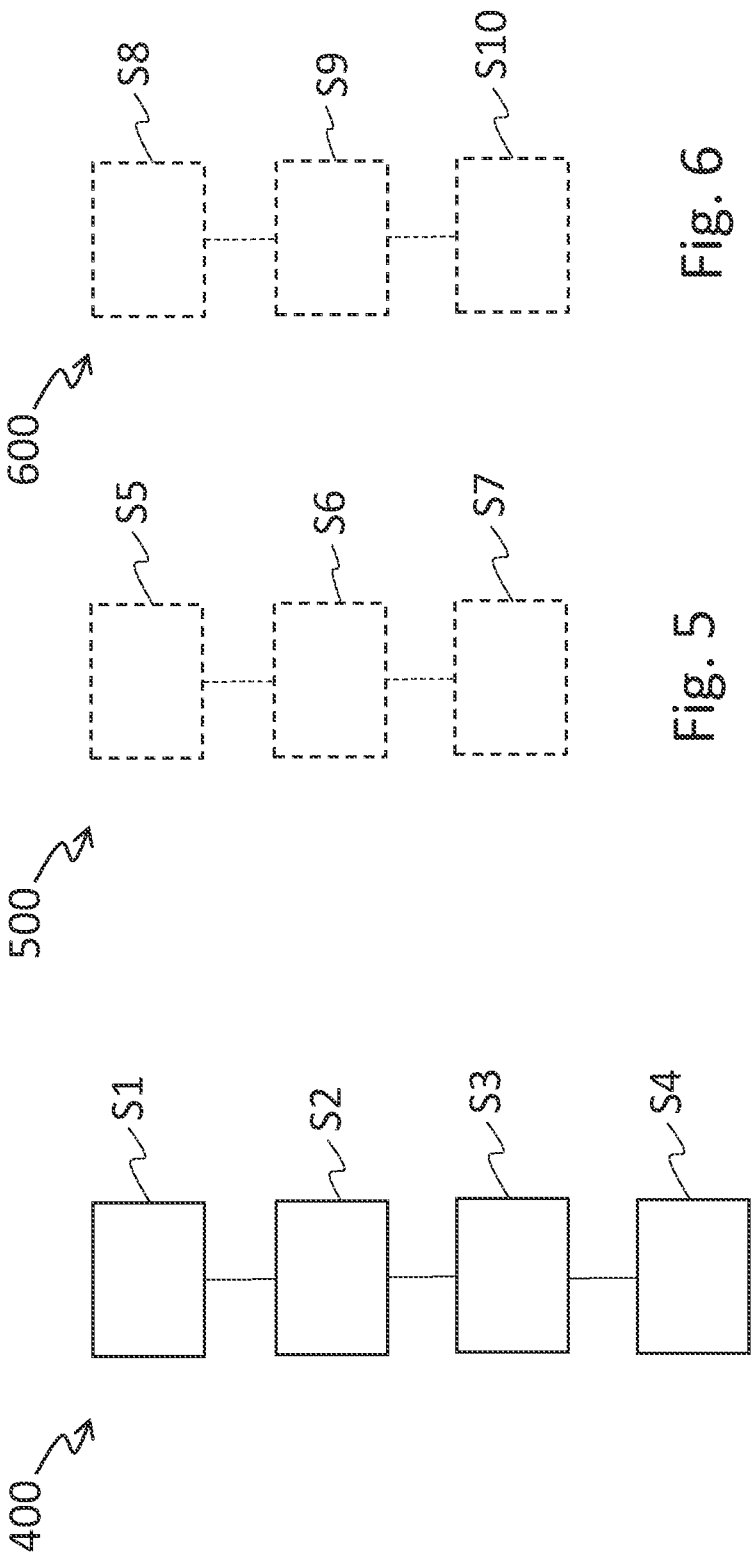

COMPUTER-IMPLEMENTED METHOD FOR CLUTCH START CONTROL OF AN INTERNAL COMBUSTION ENGINE IN A VEHICLE

TECHNICAL FIELD

The present disclosure relates to a computer-implemented method for clutch start control of an internal combustion engine in a vehicle. The present disclosure also relates to a computer program, to a computer readable medium and to a control unit for performing the method. The present disclosure further relates to a vehicle comprising such a control unit.

The general inventive concept can be applied in heavy-duty vehicles, such as trucks, buses and construction equipment. Although the invention will be described with respect to a heavy-duty vehicle, the general inventive concept is not restricted to this particular vehicle, but may also be used in other vehicles such as cars.

BACKGROUND

There is an ongoing effort in the heavy-duty vehicle industry towards improving the fuel economy of the vehicles and to provide vehicles that are more environmentally friendly. These aspects are oftentimes also considered by the drivers, in particular professional drivers of heavy-duty vehicle. Some drivers may have a driving style which results in lower fuel consumption than other driving styles. For examples, it has been common practice among drivers of heavy-duty vehicles to shut off the internal combustion engine when the vehicle is travelling along a downwardly sloping road segment in order to rely on freewheeling of the vehicle, thereby reducing the fuel consumption and environmental impact. The vehicle industry has also been considering control strategies in which the internal combustion engine is temporarily shut off under certain circumstances to reduce fuel consumption. However, when the internal combustion engine is turned on again, the drivability and productivity may be negatively affected, and the driver may perceive an unsatisfactory driving experience. Thus, there is still room for improvement in this regard.

SUMMARY

An object of the invention is to provide a method which at least partly alleviates the drawbacks discussed above. This and other objects, which will become apparent in the following discussion, are achieved by a computer-implemented method. Some non-limiting exemplary embodiments are presented in the dependent claims.

The inventors of the general inventive concept have realized that by predicting a driving scenario for an upcoming road segment, the internal combustion engine may be started on an appropriately selected gear based on the prediction, and thereby enabling improved drivability, productivity and driver experience.

According to at least a first aspect of the present disclosure, there is provided a computer-implemented method for clutch start control of an internal combustion engine, ICE, in a vehicle, the method comprising:
when the vehicle is travelling on a road with the ICE being shut off, acquiring topographic data representative of the topography of an upcoming road segment,
predicting a driving scenario for at least a part of the upcoming road segment based on the acquired topographic data,
selecting a gear based on the predicted driving scenario,
starting the ICE on the selected gear before or when the vehicle reaches said part of the road segment.

As mentioned above, by starting the ICE on a gear which has been selected based on a predicted driving scenario, which in turn is based on look-ahead information, the drivability, productivity and driver experience may be improved. It should be understood that the present disclosure envisages providing positive torque in some driving scenarios, and providing negative torque in other driving scenarios. When starting the ICE on a gear, the clutch is activated in a normal manner. The clutch needs a torque when activated, and with the computer-implemented method an appropriate torque is provided by the above gear selection.

The topographic data may suitably be obtained by a GPS system or a similar positioning system of the vehicle. As an example, the acquired data may cover several kilometres of the upcoming road, such as >~1 kilometres, for example 3-5 kilometers. Thus, the acquired topographic data will in each instance normally include topographic data for a limited length of the road as a whole, i.e. the topographic data will include information about an upcoming road segment. Suitably, as the vehicle travels on that road segment, new topographic data may be acquired, for a new upcoming road segment. The new upcoming road segment may at least partly overlap the previous road segment. Thus, it should be understood that the step of acquiring topographic data may be performed repeatedly, either continuously or at certain time intervals (for example every second).

The topographic data may suitably be acquired by a control unit which may be operatively connected to the positioning system of the vehicle. Thus, the control unit may acquire the topographic data by means of the positioning system.

As will be readily understood, the upcoming road segment covered by the acquired topographic data may have varying topography. For instance, one or more parts of the upcoming road segment may be uphill, one or more parts may be downhill, and one or more parts may be substantially flat. Such different topographies may call for different driving scenarios. For example, in case of an uphill part of the road segment, it may be predicted that the ICE should be turned on before reaching that part of the road segment, or that a certain power/torque may be required to effectively operate the ICE. On the other hand, in case of a downhill part of the road segment, it may be predicted that engine braking should be activated. Thus, it will be understood that for different driving scenarios, starting the ICE on a certain gear may be more appropriate than on another gear.

According to at least one exemplary embodiment, the method comprises:
when the vehicle is travelling on the road with the ICE being shut off, determining a desired speed range for the vehicle for said part of the upcoming road segment,
predicting that the speed of the vehicle will reach a value outside of said desired speed range when said vehicle reaches said part of the upcoming road segment if the ICE is kept shut off, and
controlling the ICE so as to counteract the vehicle speed from reaching a value outside said desired speed range when the vehicle reaches said part of the road segment.

It should be understood that this may be relevant for different driving scenarios. For, example, in case of a predicted loss of speed due to a hill climb, the ICE is started on a gear to ensure that the vehicle speed is maintained within the desired speed range. Conversely, in case the vehicle is gaining speed when riding downhill and it is predicted that the vehicle speed will exceed the upper limit of the desired speed range unless the brakes are applied or engine braking is performed, then the ICE may be started on an appropriate gear, and may suitably be downshifted for engine braking. In order to achieve a good drivability the engaging gear may be selected accordingly. Nevertheless, the gear may be quickly shifted from the initially selected gear for further controlling the vehicle, e.g. a quick downshift for engine braking. In this connection it should be noted that drivability is not only limited to the perceived feeling for the driver, but may also include adaptation to the traffic flow and achieving good productivity.

The above exemplary embodiment is based on a prediction that the vehicle speed may in the near future fall below the lower limit of the desired speed range or exceed the upper limit of the desired speed range, and that in anticipation of such an undesired event, the ICE is appropriately controlled to counteract that the predicted undesired event takes place. Nevertheless, according to at least some exemplary embodiments, a similar principle may be applied even if no prediction has been done, and yet it is detected that the vehicle speed has reached a value outside the desired speed range. This provides for an additional safety measure, and is reflected in the below presented exemplary embodiment.

Thus, according to at least one exemplary embodiment, the method comprises:
  when the vehicle is travelling on the road with the ICE being shut off, determining a desired speed range for the vehicle for said part of the upcoming road segment,
  detecting that the speed of the vehicle has reached a value outside of said desired speed range when said vehicle has reached said part of the road segment, and
  controlling the ICE so as to return the vehicle speed to a value within said desired speed range when travelling on said part of the road segment.

This is advantageous as it provides for a back-up control strategy, in case the change in speed was not predicted. It may also be conceivable that this exemplary embodiment has a narrower or wider defined desired speed range than the previous prediction-based exemplary embodiment, in which case both control strategies for the ICE may operate in parallel but with different defined desired speed ranges.

According to at least one exemplary embodiment, the step of predicting a driving scenario comprises predicting an acceleration of the vehicle or predicting a provision of propulsion power/torque to the vehicle, wherein the step of selecting a gear comprises:
  acquiring parameter data representative of a value of at least one parameter that affects the power need of the ICE,
  determining based on the acquired parameter data which one of the gears would result in the lowest loss of kinetic energy upon engagement of that gear, and
  selecting the determined gear.

This is advantageous because when it can be predicted that the vehicle will need an acceleration or propulsion torque/power to be applied, then it is desirable if as much as possible of the available kinetic energy can be maintained. However, starting the ICE and engaging a gear will inherently result in some loss of kinetic energy, but by determining (e.g. by means of estimations, look-up tables, calculations, or similar) which one of the gears will result in the lowest loss of kinetic energy upon engagement, an energy efficient control may be achieved. For instance, if the vehicle is approaching a steep hill, it may be desirable to accelerate the vehicle before the climb, the ICE may therefore be started at a relatively high gear to maintain and accelerate the vehicle (with a possible upshift) and when starting the climb it may be followed by a downshift.

According to at least one exemplary embodiment, the step of predicting a driving scenario comprises predicting a braking of the vehicle, wherein the step of selecting a gear comprises:
  acquiring parameter data representative of a value of at least one parameter that affects the power need of the ICE,
  determining based on the acquired parameter data which one of the gears would result in the highest loss of kinetic energy upon engagement of that gear, and
  selecting the determined gear.

Thus, in contrast to the previous acceleration case, in the present exemplary embodiment, you want to lose as much kinetic energy as possible when engaging the gear in order to decelerate the vehicle.

From the above two exemplary embodiments it should now be understood that by appropriately selecting a gear based on a predicted operation of the vehicle, an advantageous control strategy is obtainable. The selection of the gear may, as mentioned above, be based on input with respect to parameters that affect the power need of the ICE.

According to at least one exemplary embodiment, the at least one parameter is one or more of the following parameters:
  the current speed of the vehicle,
  the weight of vehicle,
  a radius of curvature of said part of the road segment,
  an angle of inclination of said part of the road segment.

This parameters may suitably be acquired by appropriate sensors, such as speed sensor and vehicle sensors. The curvature and inclination of the road may be acquired by cameras, lidars, radars, etc. or from map data. Other parameters may include distance to other vehicles or objects on the road.

According to at least one exemplary embodiment, the method comprises determining which gear was previously engaged before the ICE was turned off, wherein said step of starting the ICE on the selected gear is followed by performing a gear shift to said previously engaged gear. This may be advantageous on, for instance, a substantially flat part of the upcoming road segment, wherein the vehicle is travelling at a certain speed, and the ICE is started at a selected gear which minimizes kinetic loss (often a high gear), after which a shift may be made to the previously engaged gear. The gear shift may in this, and other exemplary embodiments suitably be a downshift from the selected gear to the previously engaged gear. Other examples may be that the vehicle travels in a pulse-and-glide operating mode, and/or the ICE is in a turned off state when reaching a curve, wherein the ICE is turned on or kept off, engaging a selected gear for taking the curve, and when the vehicle has exited the curve a gear shift back to the previously engaged gear may be made.

It should be understood that the general inventive concept may be implemented in connection with various different predictable driving scenarios, based on which prediction an appropriate gear is selected in association with starting the ICE. Some non-limiting examples of such driving scenarios include:
  engine braking when said part of the upcoming road segment is a downhill part, pre-starting the ICE before hill climb when said part of the upcoming road segment is an uphill part,
pulse-and-glide operating the vehicle when said part of the upcoming road segment is substantially flat,
engine braking when said part of the upcoming road segment is a curve,
starting the ICE when exiting a curve and the part of the upcoming road segment is a straight part.

It should be understood that the above non-limiting examples are just to mention a few driving scenarios in which the general inventive concept may be implemented, but there are of course others as well. For instance, the pulse-and-glide operating mode is not limited to substantially flat parts of upcoming road segments, but such an operating mode is also conceivable on non-flat parts, such as downhill, uphill, etc.

According to at least one exemplary embodiment, the method is performed when the vehicle is in a cruise control mode for automatically controlling the speed of the vehicle. Indeed, the method may suitably form part of a cruise control mode strategy, wherein a desired speed range is kept, allowing temporary shutting off of the ICE, in combination with prediction of driving scenarios for upcoming parts of road segments, based on which prediction an appropriate gear is selected for starting the ICE. When referring to starting the ICE, this may simply include engine rotation, with or without fuel combustion. Starting the ICE may for example include using the ICE for forward propulsion or for engine braking.

According to a second aspect of the present disclosure there is provided a computer program comprising program code means for performing the steps of the method according to the first aspect, including any embodiment thereof. The advantages of the computer program of the second aspect are largely analogous to the advantages of the method of the first aspect, including any embodiment thereof.

According to a third aspect of the present disclosure, there is provided a computer readable medium carrying a computer program comprising program code means for performing the steps of the method according to the first aspect, including any embodiment thereof, when said program product is run on a computer. The advantages of the computer readable medium of the third aspect are largely analogous to the advantages of the method of the first aspect, including any embodiment thereof.

According to a fourth aspect of the present disclosure, there is provided a control unit for controlling clutch start of an internal combustion engine, ICE, in a vehicle, the control unit being configured to perform the steps of the method according to the first aspect, including any embodiment thereof. The advantages of the control unit of the fourth aspect are largely analogous to the advantages of the method of the first aspect, including any embodiment thereof.

It should be understood that the control unit may control the ICE based on torque, using torque sensors or based on calculations/estimations. Another possibility, however, is that the control unit controls the ICE based on power (torque×rpm). While both methods of control are conceivable, they may have different response times.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to a fifth aspect of the present disclosure, there is provided a vehicle comprising a control unit according to the fourth aspect, including any embodiment thereof. The advantages of the vehicle of the fifth aspect are largely analogous to the advantages of the control unit of the fourth aspect, including any embodiment thereof.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. The steps of any method disclosed herein do not have to be performed in the exact order disclosed, unless explicitly stated. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF THE DRAWINGS

With reference to the appended drawings, below follows a more detailed description of embodiments of the invention cited as examples.

In the drawings:

FIG. 2 illustrates schematically another vehicle in accordance with at least one exemplary embodiment of the present disclosure, wherein the vehicle is travelling on a road.

FIG. 3 illustrates schematically components that may be included when performing the computer-implemented method according to at least some exemplary embodiments of the present disclosure.

FIG. 4 illustrates schematically a computer-implemented method in accordance with at least one exemplary embodiment of the present disclosure.

FIG. 5 illustrates schematically a computer-implemented method in accordance with at least another exemplary embodiment of the present disclosure.

FIG. 6 illustrates schematically a computer-implemented method in accordance with yet another exemplary embodiment of the present disclosure.

DETAILED DESCRIPTION OF EXAMPLE EMBODIMENTS OF THE INVENTION

Figure 1:
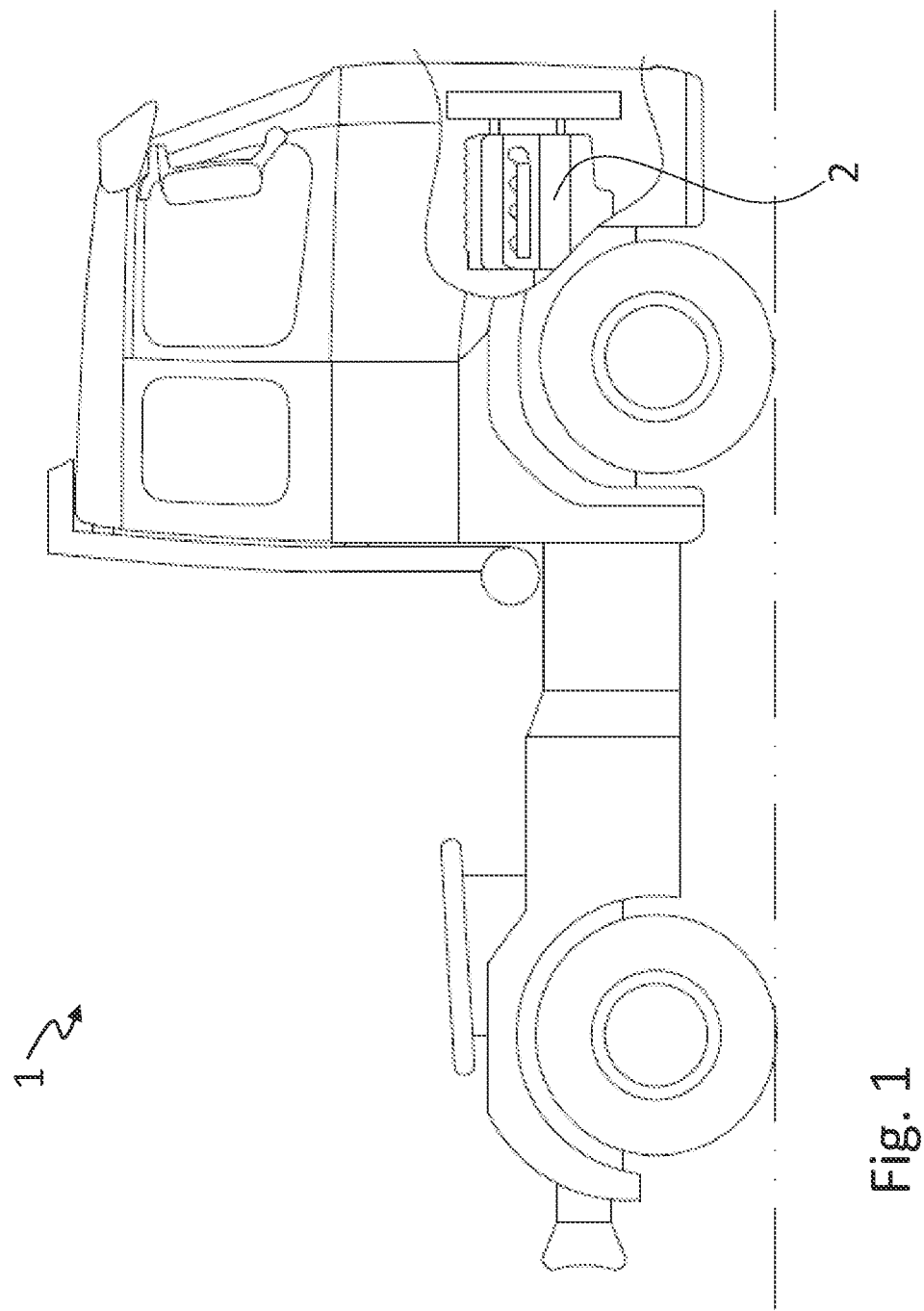
FIG. 1 illustrates schematically a vehicle comprising an internal combustion engine in accordance with at least one exemplary embodiment of the present disclosure.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates schematically a vehicle 1 comprising an internal combustion engine 2 in accordance with at least one exemplary embodiment of the present disclosure. In this example, the vehicle 1 is a heavy-duty vehicle in the form of a tractor unit, powered by an internal combustion engine 2. However, the teachings of the present disclosure may also be implemented in other types of vehicles powered by an internal combustion engine, such as busses, construction equipment and passenger cars.

FIG. 2 illustrates schematically another vehicle 10 in accordance with at least one exemplary embodiment of the present disclosure, wherein the vehicle 10 is travelling on a road 12. More specifically, the illustrated vehicle 10 is a heavy-duty vehicle combination which comprises a towing vehicle and a trailer which is towed by the towing vehicle. The towing vehicle is here illustrated in the form of a truck, powered by an internal combustion engine, and the trailer is illustrated in the form of a full trailer. It should however be understood that in other exemplary embodiments the trailer may be a semi-trailer. It should further be understood that the general inventive concept is not limited to heavy-duty vehicle combinations, but may be implemented for single vehicles as well, such as for a single heavy-duty vehicle, for instance a truck, which does not necessarily need to have a trailer connected. It should furthermore be understood that the teachings of the present disclosure may be implemented for driver-operated vehicles as well as for autonomous (self-driving) vehicles. Moreover, it should be understood that general inventive concept does not exclude an auxiliary or additional propulsion system (for example, electric) in addition to the internal combustion engine.

FIG. 3 illustrates schematically vehicle components that may be included when performing the computer-implemented method according to at least some exemplary embodiments of the present disclosure. A vehicle, such as the ones in FIG. 1 or 2, is powered by an internal combustion engine, ICE 20. The vehicle also comprises a transmission system 22, which may be any conventional transmission system. The transmission system 22 can be operated to provide different gear ratios (gears 24 symbolically indicated). A clutch (not illustrated), when started, i.e. in its coupled state, provides a mechanical linkage between the ICE 20 and the transmission system 22. The vehicle further comprises a control unit 30, which is operatively connected to the transmission system 22 for selecting appropriate gear ratios when the vehicle is traveling on the road. The control unit 30 is also operatively connected to the ICE 20 and may control the ICE 20 so that it is shut off during travel and turned back on again during travel. The vehicle may additionally comprise a positioning system 40, such as a GPS system. The control unit 30 may, by means of the positioning system 40, acquire topographic data representative of the topography of an upcoming road segment. In FIG. 2 such an upcoming road segment 100 has been indicated. The general inventive concept is not limited to a particular length of such an upcoming road segment 100, but as an illustrative example, it may typically be a couple of kilometres. However, longer or shorter settings of upcoming road segments may be conceivable without departing from the general idea of this disclosure. As illustrated in FIG. 2 an upcoming road segment 100 may include a number of different parts, which may be associated with different driving scenarios. In FIG. 2, the vehicle is currently travelling on a substantially flat part 102, but will soon reach an uphill part 104, then a crest 106, and a downhill part 108. Although FIG. 2 illustrates different parts 102, 104, 106, 108 of the upcoming road segments 100, there may of course be cases when the upcoming road segment (for which topographic data has been acquired by the control unit 30) will have much less variation, such as for instance a long, straight and substantially flat upcoming road segment. Thus, it will be understood that the control unit 30 will repeatedly be acquiring new topographic data as the vehicle 10 progresses along the road 12, wherein new topographic data representative of a new upcoming road segment may at least partly overlap with the previously acquired data (previous upcoming road segment 100). This acquiring of topographic data may, for instance, be performed in a continuous manner or at certain time intervals. Furthermore, the acquiring of topographic data may be performed irrespectively of if the ICE 20 is in shut off or is turned on.

The control unit 30 may determine to shut off the ICE 20 for reducing energy consumption and reducing the impact on the environment. For instance, this may be the case when the road 12 has a slightly positive inclination and the vehicle speed can be maintained within a desired vehicle speed without any propulsion power from the ICE 20. Suitably, the control unit 30 may receive sensor input data from a plurality of different sensors 50, including speed sensor, weight sensor, proximity sensors, etc.

The control unit 30 may, based on the acquired topographic data, predict a driving scenario for at least a part of the upcoming road segment 100. For instance, in the example illustrated in FIG. 2, the control unit 30 may predict that the ICE 20 will need to be powered in order for the vehicle 10 to effectively drive in the uphill part 104 of the upcoming road segment 100. Assuming the ICE 20 is currently in a shut off state, the control unit 30 may select a gear 24 which is appropriate for the predicted driving scenario. In for example this case, the control unit 30 may suitably, when turning on the ICE 20 before arriving to the uphill part 104, select a gear ratio which results in the lowest loss of kinetic energy. This is beneficial since you want to maintain as much as possible of the available kinetic energy when arriving starting the climb. Thereafter, the control unit 30 may determine to downshift to a lower gear to effectively drive along the uphill part 104.

In contrast to FIG. 2, in a situation in which the vehicle 10, with its ICE 20 turned off would approach a downhill part (e.g. part 108 or another downhill part), the control unit 30 may instead predict a driving scenario which includes engine braking. In such case, the control unit 30 may instead select a gear ratio which results in the highest loss of kinetic energy when starting the ICE 20, in order to effectively decelerate the vehicle 10. It should be understood that there are various conceivable driving scenarios, to which the control unit may adapt its control of the ICE 20 and the selection of the appropriate gear 24. Some non-limiting examples are given below:

engine braking when said part of the upcoming road segment is a downhill part, pre-starting the ICE 20 before hill climb when said part of the upcoming road segment is an uphill part, pulse-and-glide operating the vehicle 10 when said part of the upcoming road segment is substantially flat, engine braking when said part of the upcoming road segment is a curve, starting the ICE 20 when exiting a curve and the part of the upcoming road segment is a straight part.

From the above it should thus be understood that there are various conceivable driving scenarios in which the computer-implemented method of the present disclosure may be implemented, e.g. by means of the control unit 30. From the above, it can also be understood that the herein disclosed method for clutch start control of an ICE 20 may include providing a positive torque or a negative torque.

Turning now to the schematic charts in FIGS. 4-6, some different steps of non-limiting exemplary embodiments of the computer-implemented method of the present disclosure are illustrated. The computer-implemented method may suitably be performed by means of one or more control units, such as the control unit 30 illustrated in FIG. 3 or FIG. 7.

FIG. 4 illustrates schematically a computer-implemented method 400 in accordance with at least one exemplary embodiment of the present disclosure. More specifically, FIG. 4 illustrates a computer-implemented method 400 for clutch start control of an internal combustion engine, ICE, in a vehicle, comprising:

in a step S1, when the vehicle is travelling on a road with the ICE being shut off, acquiring topographic data representative of the topography of an upcoming road segment, in a step S2, predicting a driving scenario for at least a part of the upcoming road segment based on the acquired topographic data, in a step S3, selecting a gear based on the predicted driving scenario, in a step S4, starting the ICE on the selected gear before or when the vehicle reaches said part of the road segment.

FIG. 5 illustrates schematically a computer-implemented method 500 in accordance with at least another exemplary embodiment of the present disclosure. This exemplary embodiment may include all the steps S1-S4 of the method 400 and additionally include the illustrated steps S5-S7. Thus, the method 500 may comprises:

in a step S5, when the vehicle is travelling on the road with the ICE being shut off, determining a desired speed range for the vehicle for said part of the upcoming road segment, in a step S6, predicting that the speed of the vehicle will reach a value outside of said desired speed range when said vehicle reaches said part of the upcoming road segment if the ICE is kept shut off, and in a step S7, controlling the ICE so as to counteract the vehicle speed from reaching a value outside said desired speed range when the vehicle reaches said part of the road segment.

The control unit 30 may suitably have access to an internal or external memory in which a current desired speed range is stored. This may, for example, be part of a cruise control system of the vehicle. A speed sensor, such as one of the sensors 50 illustrated in FIG. 3, may provide speed input signal to the control unit 30 with respect to the current vehicle speed. With look-ahead information obtained through the topography data acquired by means of the positioning system 40 and other parameters, such as the weight of the vehicle (obtainable by a weight sensor) and the current vehicle speed, the control unit 30 may predict at approximately what point along the road the vehicle speed will drop below or exceed the desired speed range, and may counteract this by turning on the ICE 20 and control it appropriately (e.g. providing positive torque or negative torque, respectively).

In an alternative interpretation of FIG. 5, instead of the prediction in step S6, the step S6 may comprise: detecting that the speed of the vehicle has reached a value outside of said desired speed range when said vehicle has reached said part of the road segment. As a consequence, step S7 may in such case comprise: controlling the ICE so as to return the vehicle speed to a value within said desired speed range when travelling on said part of the road segment.

FIG. 6 illustrates schematically a computer-implemented method 600 in accordance with yet another exemplary embodiment of the present disclosure. This exemplary embodiment may include all the steps S1-S4 of the method 400, and additionally include the illustrated steps S8-S10. Steps S8-S10 may actually be substeps to step S3, as will be explained. Furthermore, the method 600 may additionally include the steps S5-S7 of method 500.

In the previously discussed method 400, the step of predicting a driving scenario (step S2) may, for example, comprises predicting an acceleration of the vehicle or providing propulsion power/torque (positive torque) to the vehicle. In such case, the step of selecting a gear (step S3) may suitably comprise:

in a step S8, acquiring parameter data representative of a value of at least one parameter that affects the power need of the ICE, in a step S9, determining based on the acquired parameter data which one of the gears would result in the lowest loss of kinetic energy upon engagement of that gear, and in a step S10, selecting the determined gear.

In an alternative interpretation of FIG. 6, in other cases, in the previously discussed method 400, the step of predicting a driving scenario (step S2) may comprise predicting a braking of the vehicle (i.e. providing a negative torque). In such cases, the step of selecting a gear (step S3) may comprise:

in step S8, acquiring parameter data representative of a value of at least one parameter that affects the power need of the ICE, in step S9, determining based on the acquired parameter data which one of the gears would result in the highest loss of kinetic energy upon engagement of that gear, and in step S10, selecting the determined gear.

The parameter data acquired in step S8 may be related to one or more of the following parameters:

the current speed of the vehicle, the weight of the vehicle, a radius of curvature of said part of the road segment, an angle of inclination of said part of the road segment.

The last two examples (radius of curvature and angle of inclination) may, for example, be obtained from the acquired topographic data. However, such parameters may also be obtainable by means of sensors and/or cameras, for instance.

As mentioned previously in this disclosure, the computer-implemented method, such as the methods 400, 500, 600 illustrated in FIGS. 4-6, may comprise: determining which gear was previously engaged before the ICE was turned off, wherein said step of starting the ICE on the selected gear is followed by performing a gear shift to said previously engaged gear. Said gear shift may, for example, be a downshift from the selected gear to the previously engaged gear.

Figure 7:
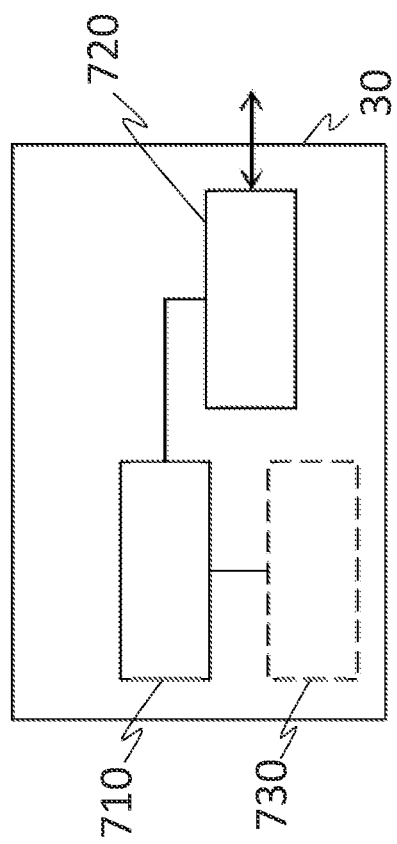
FIG. 7 schematically illustrates a control unit according to at least one exemplary embodiment of the present disclosure.

FIG. 7 schematically illustrates a control unit 30 according to at least one exemplary embodiment of the present disclosure. In particular, FIG. 7 illustrates, in terms of a number of functional units, the components of a control unit 30 according to exemplary embodiments of the discussions herein. The control unit 30 may be comprised in any vehicle disclosed herein, such as the ones illustrated in FIGS. 1 and 2, and others discussed above. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 30 to perform a set of operations, or steps, such as the method discussed in connection to FIG. 4, FIG. 5 and/or FIG. 6 and exemplary embodiments thereof discussed throughout this disclosure. For example, the storage medium 730 may store the set of operations, and the processing circuitry 710 may be configured to retrieve the set of operations from the storage medium 730 to cause the control unit 30 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit 30 may further comprise an interface 720 for communications with at least one external device such as the positioning system 40, the sensors 50, the transmission system 22, and the ICE 20 discussed herein. As such, the interface 720 may comprise one or more transmitters and receivers, comprising analogue and digital components and a suitable number of ports for wireline or wireless communication.

The processing circuitry 710 controls the general operation of the control unit 30, e.g. by sending data and control signals to the interface 720 and the storage medium 730, by receiving data and reports from the interface 720, and by retrieving data and instructions form the storage medium 730. Other components, as well as the related functionality, of the control unit 30 are omitted in order not to obscure the concepts presented herein.

Figure 8:
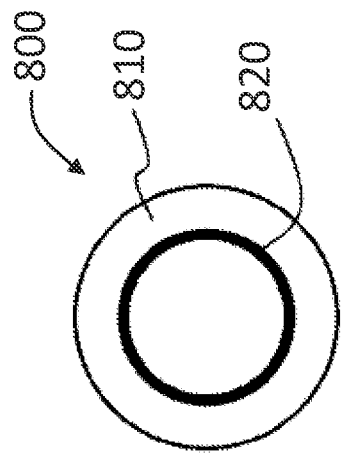
FIG. 8 schematically illustrates a computer program product according to at least one exemplary embodiment of the present disclosure.

FIG. 8 schematically illustrates a computer program product 800 according to at least one exemplary embodiment of the present disclosure. More specifically, FIG. 8 illustrates a computer readable medium 810 carrying a computer program comprising program code means 820 for performing the methods exemplified in FIG. 4, FIG. 5 and/or FIG. 6, when said program product is run on a computer. The computer readable medium 810 and the program code means 820 may together form the computer program product 800.

The invention claimed is:

1. A computer-implemented method for control of an internal combustion engine, ICE, in a vehicle, comprising:
when the vehicle is travelling on a road with the ICE being shut off, acquiring topographic data representative of the topography of an upcoming road segment,
predicting a driving scenario for at least a part of the upcoming road segment based on the acquired topographic data,
selecting a gear based on the predicted driving scenario,
starting the ICE on the selected gear before or when the vehicle reaches said part of the road segment,
when the vehicle is travelling on the road with the ICE being shut off, determining a desired speed range for the vehicle for said part of the upcoming road segment,
predicting that the speed of the vehicle will reach a value outside of said desired speed range when said vehicle reaches said part of the upcoming road segment if the ICE is kept shut off, and
controlling the ICE so as to counteract the vehicle speed from reaching a value outside said desired speed range when the vehicle reaches said part of the road segment.

2. The method according to claim 1, comprising
when the vehicle is travelling on the road with the ICE being shut off, determining a desired speed range for the vehicle for said part of the upcoming road segment,
detecting that the speed of the vehicle has reached a value outside of said desired speed range when said vehicle has reached said part of the road segment, and
controlling the ICE so as to return the vehicle speed to a value within said desired speed range when travelling on said part of the road segment.

3. The method according to claim 1, wherein said step of predicting a driving scenario comprises predicting an acceleration of the vehicle or providing propulsion power/torque to the vehicle, wherein the step of selecting a gear comprises:
acquiring parameter data representative of a value of at least one parameter that affects a power need of the ICE,
determining based on the acquired parameter data which one of a plurality of gears would result in the lowest loss of kinetic energy upon engagement of that gear, and
selecting the determined gear.

4. The method according to claim 3, wherein said at least one parameter is one or more of the following parameters:
the current speed of the vehicle,
the weight of vehicle,
a radius of curvature of said part of the road segment,
an angle of inclination of said part of the road segment.

5. The method according to claim 1, wherein said step of predicting a driving scenario comprises predicting a braking of the vehicle, wherein the step of selecting a gear comprises:
acquiring parameter data representative of a value of at least one parameter that affects a power need of the ICE,
determining based on the acquired parameter data which one of a plurality of gears would result in the highest loss of kinetic energy upon engagement of that gear, and
selecting the determined gear.

6. The method according to claim 1, comprising:
determining which gear was previously engaged before the ICE was shut off, wherein said step of starting the ICE on the selected gear is followed by performing a gear shift to said previously engaged gear.

7. The method according to claim 6, wherein said gear shift is a downshift from said selected gear to said previously engaged gear.

8. The method according to claim 1, wherein said driving scenario is one of:

engine braking when said part of the upcoming road segment is a downhill part, pre-starting the ICE before hill climb when said part of the upcoming road segment is an uphill part, pulse-and-glide operating the vehicle when said part of the upcoming road segment is substantially flat, engine braking when said part of the upcoming road segment is a curve, starting the ICE when exiting a curve and the part of the upcoming road segment is a straight part.

9. The method according to claim 1, wherein the method is performed when the vehicle is in a cruise control mode for automatically controlling the speed of the vehicle.

10. A non-transitory computer readable medium carrying a computer program comprising program code for performing the steps of the method according to claim 1 when said program code is run on a computer.

11. A control unit for controlling an internal combustion engine ("ICE") in a vehicle, the control unit being configured to perform the steps of the method according to claim 1.

12. A vehicle comprising a control unit according to claim 11.

13. A computer-implemented method for control of an internal combustion engine ("ICE") in a vehicle, comprising:

when the vehicle is travelling on a road with the ICE being shut off, acquiring topographic data representative of the topography of an upcoming road segment, predicting a driving scenario for at least a part of the upcoming road segment based on the acquired topographic data, selecting a gear based on the predicted driving scenario, starting the ICE on the selected gear before or when the vehicle reaches said part of the road segment, when the vehicle is travelling on the road with the ICE being shut off, determining a desired speed range for the vehicle for said part of the upcoming road segment, detecting that the speed of the vehicle has reached a value outside of said desired speed range when said vehicle has reached said part of the road segment, and controlling the ICE so as to return the vehicle speed to a value within said desired speed range when travelling on said part of the road segment.

14. A computer-implemented method for control of an internal combustion engine ("ICE") in a vehicle, comprising:

when the vehicle is travelling on a road with the ICE being shut off, acquiring topographic data representative of the topography of an upcoming road segment, predicting a driving scenario for at least a part of the upcoming road segment based on the acquired topographic data, selecting a gear based on the predicted driving scenario, starting the ICE on the selected gear before or when the vehicle reaches said part of the road segment, wherein said step of predicting a driving scenario comprises predicting an acceleration of the vehicle or providing propulsion power/torque to the vehicle, wherein the step of selecting a gear comprises:

acquiring parameter data representative of a value of at least one parameter that affects a power need of the ICE, determining based on the acquired parameter data which one of a plurality of gears would result in the lowest loss of kinetic energy upon engagement of that gear, and selecting the determined gear.

15. A computer-implemented method for control of an internal combustion engine ("ICE") in a vehicle, comprising:

when the vehicle is travelling on a road with the ICE being shut off, acquiring topographic data representative of the topography of an upcoming road segment, predicting a driving scenario for at least a part of the upcoming road segment based on the acquired topographic data, selecting a gear based on the predicted driving scenario, starting the ICE on the selected gear before or when the vehicle reaches said part of the road segment, wherein said step of predicting a driving scenario comprises predicting a braking of the vehicle, wherein the step of selecting a gear comprises:

acquiring parameter data representative of a value of at least one parameter that affects a power need of the ICE, determining based on the acquired parameter data which one of a plurality of gears would result in the highest loss of kinetic energy upon engagement of that gear, and selecting the determined gear.

16. A computer-implemented method for control of an internal combustion engine ("ICE") in a vehicle, comprising:

when the vehicle is travelling on a road with the ICE being shut off, acquiring topographic data representative of the topography of an upcoming road segment, predicting a driving scenario for at least a part of the upcoming road segment based on the acquired topographic data, selecting a gear based on the predicted driving scenario, starting the ICE on the selected gear before or when the vehicle reaches said part of the road segment, and determining which gear was previously engaged before the ICE was shut off, wherein said step of starting the ICE on the selected gear is followed by performing a gear shift to said previously engaged gear.

* * * * *